United States Patent [19]

Gart

[11] Patent Number: 4,879,451

[45] Date of Patent: Nov. 7, 1989

[54] LASER CUT VIDEO DISPLAY TERMINAL FILTER SCREEN

[75] Inventor: Mark Gart, Novato, Calif.

[73] Assignee: Sun-Flex Company, Inc., Novato, Calif.

[21] Appl. No.: 219,537

[22] Filed: Jul. 14, 1988

[51] Int. Cl.⁴ .............................................. B23K 26/18

[52] U.S. Cl. ........................... 219/121.69; 219/121.71

[58] Field of Search ........... 219/121.6, 121.85, 121.68, 219/121.69, 121.7, 121.71, 54.78, 121.79, 121.82, 121.8; 358/252

[56] References Cited

U.S. PATENT DOCUMENTS

| | | | |
|---|---|---|---|
| Re. 27,617 | 4/1973 | Olsen | 161/6 |
| 3,174,837 | 3/1965 | Mears | 29/191 |
| 3,226,527 | 12/1965 | Harding | 219/384 |
| 3,371,190 | 2/1968 | Meyer | 219/384 |
| 3,372,290 | 3/1968 | Sowa et al. | 310/5 |
| 3,582,189 | 6/1971 | Moritz et al. | 350/276 |
| 3,594,261 | 7/1971 | Broerman | 161/62 |
| 4,028,525 | 6/1977 | Mominee et al. | 219/121 L |
| 4,128,752 | 12/1978 | Gravel | 219/121.68 |
| 4,131,782 | 12/1978 | Einstein et al. | 219/121 LM |
| 4,218,606 | 8/1980 | Whitman, III | 219/121 L |
| 4,246,613 | 1/1981 | Choder et al. | 358/245 |
| 4,262,186 | 4/1981 | Provancher et al. | 219/121 LH |
| 4,343,358 | 8/1982 | Gryskiewicz | 166/277 |
| 4,354,205 | 10/1982 | Lowe et al. | 358/250 |
| 4,378,480 | 3/1983 | Langhans | 166/227 |
| 4,390,243 | 6/1983 | Hammerschlag | 350/319 |
| 4,427,264 | 1/1984 | Kamerling | 350/276 |
| 4,473,737 | 9/1984 | Anthony | 219/121 LL |
| 4,504,867 | 3/1985 | Keller | 358/247 |
| 4,529,268 | 7/1985 | Brown | 358/252 |
| 4,562,481 | 12/1985 | Trakas | 358/252 |
| 4,568,815 | 2/1986 | Kimbara et al. | 219/191 LK |
| 4,577,928 | 3/1986 | Brown | 350/276 R |
| 4,591,920 | 5/1986 | Yano | 358/250 |
| 4,633,322 | 12/1986 | Fourny | 358/252 |
| 4,652,085 | 3/1987 | Selling et al. | 350/310 |
| 4,672,168 | 6/1987 | Saunders et al. | 219/121 LK |

OTHER PUBLICATIONS

Materials Processing with Excimer Lasers, by Darcy Poulin, et al., presented at ICALEO '87 Nov. 11, 1987.

*Primary Examiner*—C. L. Albritton

*Attorney, Agent, or Firm*—Townsend & Townsend

[57] ABSTRACT

A filter screen for a video display terminal is formed by ablating a sheet of plastic material with an excimer laser beam to produce desired apertures in the sheet spaced by webs of the sheet material. The filter screen formed in this manner can produce clean cut apertures in the sheet material and the retained material or webs between the apertures can be reduced to small dimensions because of the control of the laser beam. The sheet material can be coated for optical reflection control and for radiation control either before or after formation as the filter screen. The filter screen and the method for its formation is disclosed.

10 Claims, 2 Drawing Sheets

LASER CUT VIDEO DISPLAY TERMINAL FILTER SCREEN

FIELD OF THE INVENTION

This invention relates generally to the formation of a filter screen for a display surface as used in a video display terminal wherein the filter screen is used to reduce or eliminate radiation of electromagnetic and static electricity from within the terminal and to reduce or eliminate the surface glare caused by reflection of background lighting near and around the face of the display surface. More particularly, the invention relates to a method and apparatus for the production of such filter screens from a continuous sheet of material by laser beam cutting of the material.

BACKGROUND OF THE INVENTION

Video display terminals are now commonplace as a result of the rapid increase in the use of computers and the like. The usual display surface of such a terminal is a cathode ray tube but other possible display surfaces include light emitting diodes (LED), liquid crystal diodes (LCD) or plasma display devices. Since the display surface of a terminal is usually relatively dark, it serves to reflect glare from the surrounding environment, hence reading of the information on the display surface can be difficult. This glare problem was to a large extent overcome by the addition of a glare filter as described in U.S. Pat. No. 4,253,737 issued to Patrick Brennan and Eric Thomson.

An equally and possibly more serious problem is the radiation of electromagnetic energy from the area of the display surface and the generation of static electrical field adjacent to the surface. Electromagnetic radiation is more likely to occur with the use of a cathode ray tube as a display surface; however static electrical fields can exist with other forms of display surfaces. While a good deal of attention has been directed toward the suppression of electromagnetic radiation, it has not been completely eliminated from unshielded cathode ray tubes and other display devices. Throughout this specification the display surface of the video display terminal will be most usually referred to as a cathode ray tube; however, it should be understood that the present invention is applicable to any form of display surface where glare and radiation can occur.

Currently electromagnetic radiation from the face of a cathode ray tube is reduced by the use of a conductive filter screen placed in front of the tube. The filter screen is connected electrically to the system ground of the cathode ray tube to conduct the radiation and any generated static electrical fields to the system ground and thus to reduce or eliminate the radiation from the face of the tube. These filter screens have also been formed or coated with glare reducing materials to reduce the reflection of surrounding light from the face of the tube.

Filter screens of the prior art type have been formed from woven fine yarn, wires or fibers to produce a mesh fabric of those fibers. The fabric is then cut and framed to the desired size and coated or impregnated with conductive and nonreflective materials as desired to form the filter screen for the face of a cathode ray tube. The fibers of the fabric should have a diameter in the 30 to 80 micron range, depending on whether the application is for color or black and white terminals. The color terminals have a finer dot pattern or pixcel dot size on the face of the cathode ray tube and therefore require a mesh designed for color displays and a more critical orientation of the fabric with respect to the face of the cathode ray tube. Typically the mesh needed for a display terminal filter screen is formed from fibers in the range of 0.001 inches (0.00254 centimeters) to 0.003 inches (0.00762 centimeters) diameter and a thread count of 75 to 300 fibers per inch. The limitation on the thread count of the mesh material is the limitation on the ability to form fibers of a smaller diameter, and the utility of the mesh for display terminal filter screens is the spacing between apertures in the mesh; that spacing being limited by the fiber size. The mesh formed by these fibers is typically then coated with a conductive coating and an anti-reflective color coating is then applied.

The production of mesh materials to the above specifications has been difficult and the cost of producing filter screens of such materials has been expensive. A method for forming suitable and desirable screen materials for the purpose above described at an increased rate and at a reduced cost has been needed.

SUMMARY OF THE PRESENT INVENTION

The present invention is directed to a method and apparatus for the formation of filter screen material that can be conductive for electromagnetic and static radiation and non-reflective for glare reduction. It is the object of the present invention to form the filter screen by ablating materials from a continuous film of material with the use of an excimer laser. Ablation, as used in this specification, is intended to mean the complete removal of material as by decomposition of the material through the introduction of laser energy in the ultraviolet range.

In a paper delivered at the ICALEO '87, Nov. 11. 1987 titled MATERIALS PROCESSING WITH EXCIMER LASERS by Darcy Poulin, John Reid and Thomas Znotins, the use of excimer lasers has been described. As stated in that paper, the use of lasers in materials processing applications has evolved to the point where high power lasers have been commonplace in many industries. Applications include the cutting, welding and drilling of metals, the scribing of ceramics, the cutting of plastics and composites, and the marking of a wide variety of materials and finished products. Common to many of these applications is a thermal mechanism whereby the laser radiation heats the materials so as to cause melting, evaporation or vaporization. Those thermal mechanisms limit the capability of many lasers in processing applications. In some cases, as in the cutting or drilling of plastics or polymers, unwanted flow of melted material can substantially degrade the edge quality or limit the minimum thickness which can be processed. It has been suggested that excimer lasers offer the potential for greatly extending the capabilities of laser based processing.

An advantage of excimer lasers for materials processing applications is their ultraviolet output. If particular, it has been demonstrated that the short pulses of UV radiation from an excimer laser can ablate organic materials very cleanly, leaving well defined edges and resulting in minimal damage to the surrounding unexposed material.

It is the object of the present invention to apply the capabilities of excimer lasers to the formation of a filter screen for use with a cathode ray tube as is employed in video display terminals.

As previously described, prior art filter screens have been made from woven fabrics of extruded plastic fibers. Such fabrics typically have between 75 and 300 threads to the inch with the count of fibers and the spacing between fibers in the fabric being limited to the size of fibers that may be extruded with presently available equipment. Wider spacing of fibers is desirable for the viewing of displays on the face of a cathode ray tube while closer spacing is desirable for the reduction of radiation and reflection. The spacing between fibers in the fabric is limited by the size of fibers that can be extruded. Thus, the effectiveness of the filter screen produced from woven fabrics is limited to the size of extrudable fibers.

In accord with the present invention, the filter screen is to be fabricated by ablating material from a continuous film with the spacing between ablated areas being the equivalent of the fibers of a fabric. The size of the ablated portions can be controlled by controlling the ablation process and the spacing between ablated portions can be reduced to as small a dimension as will be necessary for integrity in the ablated sheet. In accord with the present invention, the fabrication is accomplished with the use of an excimer laser.

An object of the present invention is the fabrication of a filter screen for cathode ray tubes by ablating materials from a continuous sheet of stock with the use of an excimer laser.

A further object in accord with the preceding object is the formation of a filter screen formed from a sheet stock wherein the fabricated screen has uniformly sized and cleanly cut ablated portions spaced by relatively thin retained portions of the sheet stock.

Further objects and features of the invention will be readily apparent to those skilled in the art from the appended drawings and specification illustrating a preferred embodiment wherein:

DETAILED DESCRIPTION OF THE INVENTION

Figure 1:
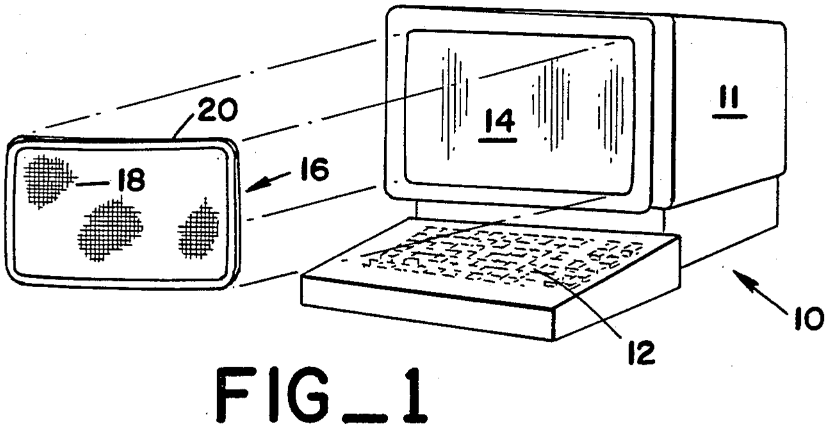
FIG. 1 is an exploded perspective view of a video display terminal illustrating the use of a filter screen as may be with the material produced in accord with the present invention.

The present invention is useful in a device having a display surface and that has particular application for a video display terminal, television or other device using a cathode ray tube as the display means. As illustrated in FIG. 1, a video display terminal is shown at 10 having a case 11 and a keyboard 12. The display face of the video display terminal is a cathode ray tube 14. A filter screen 16 having a material 18 contained within a frame 20 is illustrated spaced from the face 14 of the cathode ray tube; it should be understood that the filter screen 16 may be mounted flush on the face 14 of the cathode ray tube either behind the bezel portion of the case 11 or within the opening of the bezel or may be mounted to the front of the video display terminal at some space from the face of the cathode ray tube.

Figure 2:
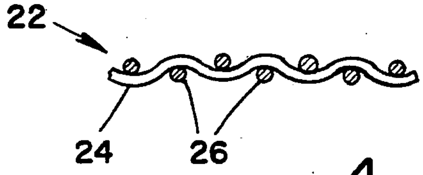
FIG 2 (PRIOR ART)
FIG. 2 is a cross-sectional view of the prior art filter screens formed from woven fabrics.

FIG. 2 illustrates the typical prior art materials that have been used in forming filter screens for video display terminals. As here illustrated, the filter screen is a woven fabric 22 having fibers 24 in one direction and fibers 26 in the other direction of the fabric.

Figure 3:
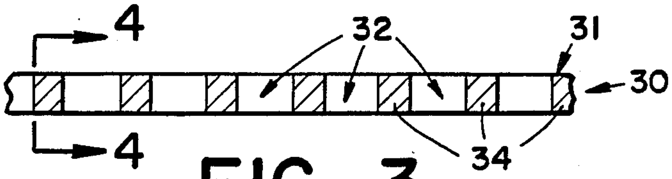
FIG. 3 is a cross-sectional view of a filter screen formed in accord with the present invention.

FIG. 3 illustrates, in cross section, a filter screen 30 fabricated in accord with the present invention. In accord with the present invention, a continuous sheet 31 of suitable material is fabricated by ablating portions of the sheet stock to produce a series of duplicated holes 32 spaced by retained portions 34 in the form of webs of the sheet stock.

Figure 4:
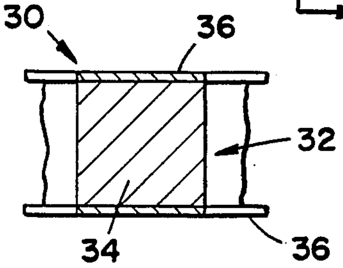
FIG. 4 is an enlarged cross-sectional view taken along the lines 4—4 of FIG. 3.

FIG. 4 is an enlarged illustration of a portion of a filter screen as shown in FIG. 3 with enlargement permitting the illustration of coating materials 36 at both sides of the retained portions 34 of the sheet stock.

Figure 5:
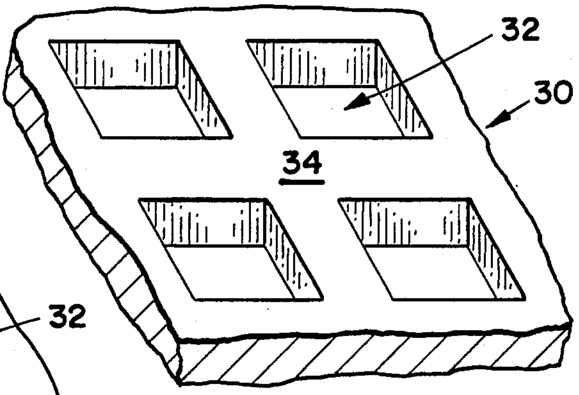
FIG. 5 is a perspective view of a portion of a filter screen having rectangular holes.
Figure 6:
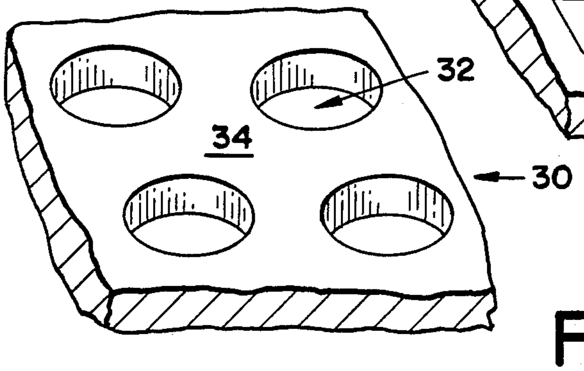
FIG. 6 is a perspective view of a portion of a filter screen having circular holes.

FIGS. 5 and 6 illustrate two possible forms that the ablated portions 32 can take. As will be described hereinafter, the spacing and form of the ablated portions or holes 32 will be determined by the form of a mask that is placed between the sheet stock 31 and the laser used to ablate the stock. In these views of the filter screen 30 it will be seen that the holes 32 may be made of suitable sizes to permit viewing of the smallest pixcel size display on the face of a cathode ray tube and the retained portions 34 can be substantially smaller in linear dimension than the width of the holes 32. Further, these views are intended to illustrate the clean edges of the holes ablated through the sheet stock 31; this clean edge feature being accomplished with the use of the laser as the fabricating tool.

Figure 7:
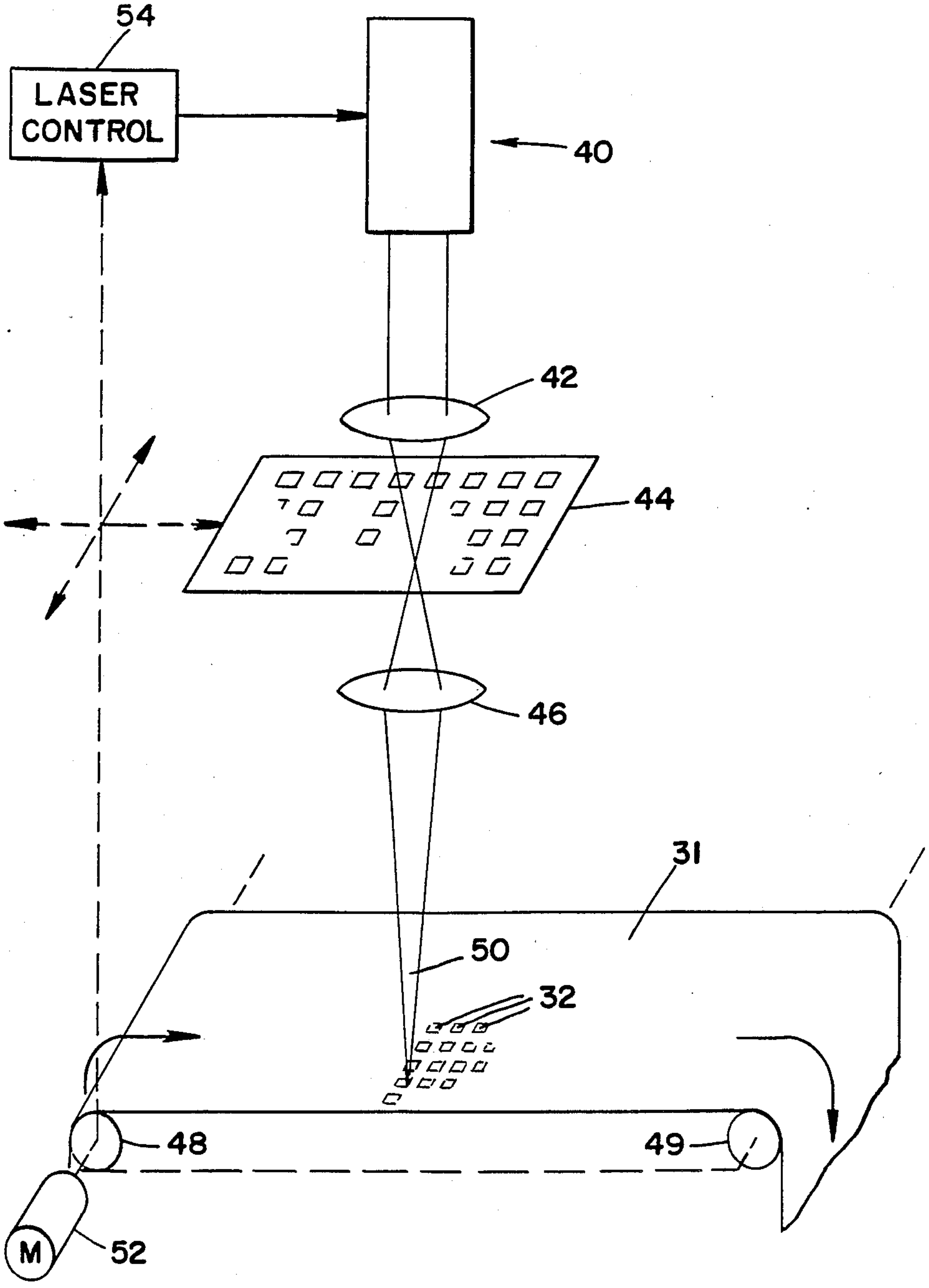
FIG. 7 is a schematic illustration of an apparatus using an excimer laser for the production of a filter screen of the present invention.

FIG. 7 illustrates, in schematic form, the use of an excimer laser as the tool for fabricating the filter screen as illustrated in FIGS. 3-6. The excimer laser 40 is shown in block diagram from only; the construction and operation of excimer lasers is a standard item of commerce and is available from many manufacturers. Excimer lasers are described in the paper of Poulin et al. previously identified. The beam of the laser is focused through a lens system 42 and onto a mask 44 where large outlines of the desired pattern to be ablated are provided. The laser energy passing through the mask 44 is then again focused by a lens 46 to be directed to the surface of a continuous sheet stock 31 which is to be fabricated in the desired form. The sheet stock may pass over roller guides 48 and 49 from a source, not shown, to a take-up roll, not shown. The focused beam 50 of the laser is directed to the work surface area of the sheet stock 31 where the individual ablated portions 32 of FIGS. 3-6 are formed.

Illustrated in FIG. 7 in schematic form only is a motor 52 which is adapted to be connected by suitable mechanical systems (here shown in dotted lines) to the rollers 48 and 49 and the mask 44 for movement of the mask in the path of the laser beam and for linear movement of the sheet stock 31 from supply source to take-up roll. The mechanical system is also shown connected to laser control 54 to provide for synchronism of the control of the laser with the movements of the mask and the workpiece. The illustration of these elements is intended only to show that such controls are needed for a production line fabrication of the filter screen material of the present invention. The excimer laser is controlled to provide pluses of its output energy for the ablative removal of layers of the workplace in the production of the perforated material. The beam of the laser at its focal point is smaller than the expected focused beam pixcel dot size on the face of a cathode ray tube.

Having fabricated the filter screen material in accord with the present invention, the sheet material is then cut to desirable size for use with a video display terminal. If desired, the cut material may be secured to a frame similar to that shown in FIG. 1 for attachment to the face of a video display terminal. The sheet material may either be coated with a conductive layer before fabrication in to its ablated form or may be coated after ablation or when assembled into a frame as a filter screen.

The fabricating feature of the present invention, the use of an excimer laser for the formation of precisely controlled ablation of plastic or polymer materials, can be an economic advance in the production of filter screens for video display terminals. Woven fabrics of extruded fibers having the desired thread count per inch and desired aperture size have been in short supply, and the possibility of producing fabrics of higher thread count and aperture size than the fabric currently available does not seem likely. On the other hand, extruded sheet stock of a desired thickness and strength is readily available, and the advances that have been made in the uses of excimer lasers as fabricating tools have made it possible to ablate these extruded sheets to produce the filter screen herein described with apertures as desired and with webbing between apertures of a desired size. For example, with the use of an excimer laser an array of 70 um square holes can be ablated through a 1 mil polyimide sheet leaving webbing between the holes 35 um in width. It is possible to produce apertures as small as the smallest pixcel size on a display device to as large as 100 um apertures and the apertures can be separated by a web dimension of as small as 15 um. The desired and required features of a filter screen having uniformly spaced holes through its surface, cleanly cut holes, conductive coatings for reduction of radiation through the screen, and nonreflective coatings are accomplishable with the method of the present invention.

An additional feature attributable to the workpiece materials used for the fabrication of the filter screen is the fabrication of the screen from sheet stock having greater penetration resistance strength over conventional woven fabrics. Sheet materials of such strength are available and can be ablated in the process of the present invention to produce a filter screen that can reduce the possibility of damage to the face of the video display terminal.

While certain preferred embodiments of the present invention have been specifically described and disclosed it should be understood that the invention is not limited thereto as many variations will be readily apparent to those skilled in the art and the invention is to be given its broadest possible interpretation within the terms of the following claims.

I claim:

1. A method of forming a radiation and reflection filter screen for a video display terminal comprising the steps of:
- placing a sheet stock of plastic material on a substantially flat surface;
- focusing a beam of coherent electrical energy toward said plastic sheet on said surface;
- moving said beam in a predetermined pattern to move said beam across and longitudinally along said sheet stock;
- pulsing said beam in accordance with said movement to direct said focused beam in discrete areas across and along said sheet; and
- controlling said focusing, pulsing and movement of said beam to cause said beam to ablate said sheet stock in said predetermined pattern.

2. The method of claim 1 wherein said sheet stock of plastic material is precoated with electrically conductive material on at least one side.

3. The method of claim 1 wherein said sheet stock of plastic material is precoated with electrically conductive material on at least one side and with a reflection reducing surface on the other side thereof.

4. The method of claim 1 wherein said sheet stock is a continuous sheet of plastic material.

5. The method of claim 1 wherein said beam is focused to produce a concentration of coherent electrical energy adapted to ablate said material in a pattern of uniformly spaced holes having dimensions of between the pixcel dot size of said display terminal and about 100 um in width and in length on said sheet with webbing spacing between said holes of about 15 um and larger in width.

6. The method of claim 1 wherein said beam is focused to produce a circular beam of electrical energy addressable to locations at least as small as the pixcel dot size of said display terminal.

7. The method of claim 1 wherein said beam is focused to produce a beam on said sheet that is smaller than the focused beam of the electron beam of said video display terminal on the face of said video display terminal.

8. A sheet material for use in fabricating a filter screen for a video display terminal for reducing radiation and reflection energy from the face of said video display terminal comprising:
- a continuous sheet of plastic material having an electrical conductive surface on at least one side thereof;
- aperture perforations through said sheet in discrete and uniform spacing along and across said sheet:
- said aperture perforations formed by ablating said sheet with a focused laser beam pulsed to produce said discrete and uniformly spaced aperture perforations;
- said filter screen being cut from said sheet and being adapted to be placed in front of the face of said video display terminal; and
- said filter screen being electrically connected to electrical ground of said video display terminal to conduct radiated energy away from said face of said video display terminal.

9. The filter screen of claim 8 wherein said continuous sheet is coated on at least one surface with a reflection resistance surface.

10. The filter screen of claim 8 wherein said filter screen material cut from said sheet is attached to a perimeter frame adapted to be mounted adjacent to the face of said display surface of said video display terminal.

* * * * *